(12) United States Patent
Schreiber et al.

(10) Patent No.: US 7,744,346 B2
(45) Date of Patent: Jun. 29, 2010

(54) LEADING EDGE CONFIGURATION FOR COMPRESSOR BLADES OF GAS TURBINE ENGINES

(75) Inventors: Karl Schreiber, Am Mellensee (DE); Roland Heinrich, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 674 days.

(21) Appl. No.: 11/640,375

(22) Filed: Dec. 18, 2006

(65) Prior Publication Data

US 2007/0140859 A1    Jun. 21, 2007

(30) Foreign Application Priority Data

Dec. 21, 2005    (DE) ................. 10 2005 061 673

(51) Int. Cl.
   B64C 27/46    (2006.01)
(52) U.S. Cl. .............. 416/62; 416/223 R; 416/224; 416/235; 416/236 R
(58) Field of Classification Search ............. 416/62, 416/223 R, 224, 235, 236 R
See application file for complete search history.

(56) References Cited

U.S. PATENT DOCUMENTS

| | | | | |
|---|---|---|---|---|
| 2,591,757 A | * | 4/1952 | Young | 416/95 |
| 3,174,711 A | * | 3/1965 | Sullivan | 244/123.1 |
| 3,215,511 A | * | 11/1965 | Chisholm et al. | 428/564 |
| 3,294,366 A | | 12/1966 | Coplin | |
| 3,430,898 A | * | 3/1969 | Parechanian et al. | 244/121 |
| 3,856,434 A | * | 12/1974 | Hoffmann | 416/184 |
| 4,130,380 A | * | 12/1978 | Kaiser | 416/197 A |
| 4,693,435 A | * | 9/1987 | Percival et al. | 244/91 |
| 4,738,594 A | * | 4/1988 | Sato et al. | 416/224 |
| 4,944,655 A | * | 7/1990 | Merz | 416/61 |
| 5,044,884 A | * | 9/1991 | Thibault et al. | 416/189 |
| 5,358,379 A | * | 10/1994 | Pepperman et al. | 415/191 |
| 5,785,498 A | | 7/1998 | Quinn | |
| 5,791,874 A | * | 8/1998 | Lang | 416/62 |
| 6,471,485 B1 | | 10/2002 | Rossmann | |
| 2004/0184921 A1 | | 9/2004 | Schreiber | |

FOREIGN PATENT DOCUMENTS

| | | |
|---|---|---|
| DE | 1 628 355 | 10/1970 |
| DE | 38 21 005 C2 | 1/1992 |
| DE | 195 35 713 A1 | 4/1996 |
| DE | 197 51 129 C1 | 6/1999 |
| DE | 19803589 | 8/1999 |
| DE | 103 07 610 A1 | 9/2004 |
| JP | 5920590 | 12/1984 |

OTHER PUBLICATIONS

European Search Report dated Apr. 8, 2010 from counterpart European patent application.

* cited by examiner

*Primary Examiner*—Igor Kershteyn
(74) *Attorney, Agent, or Firm*—Timothy J. Klima; Shuttleworth & Ingersoll, PLC

(57) ABSTRACT

In a supersonic area, on a leading edge (2) of a compressor blade (1) for a gas turbine engine, a replaceable, longitudinally elastically deformable leading edge rail (7) with slender tip (11) and limited weight is positively held in a locating groove (3) and at a stop (6) and elastically locked by the curved blade form. While the maintenance effort is reduced, safe operation and long service life of the compressor (fan) are ensured.

19 Claims, 1 Drawing Sheet

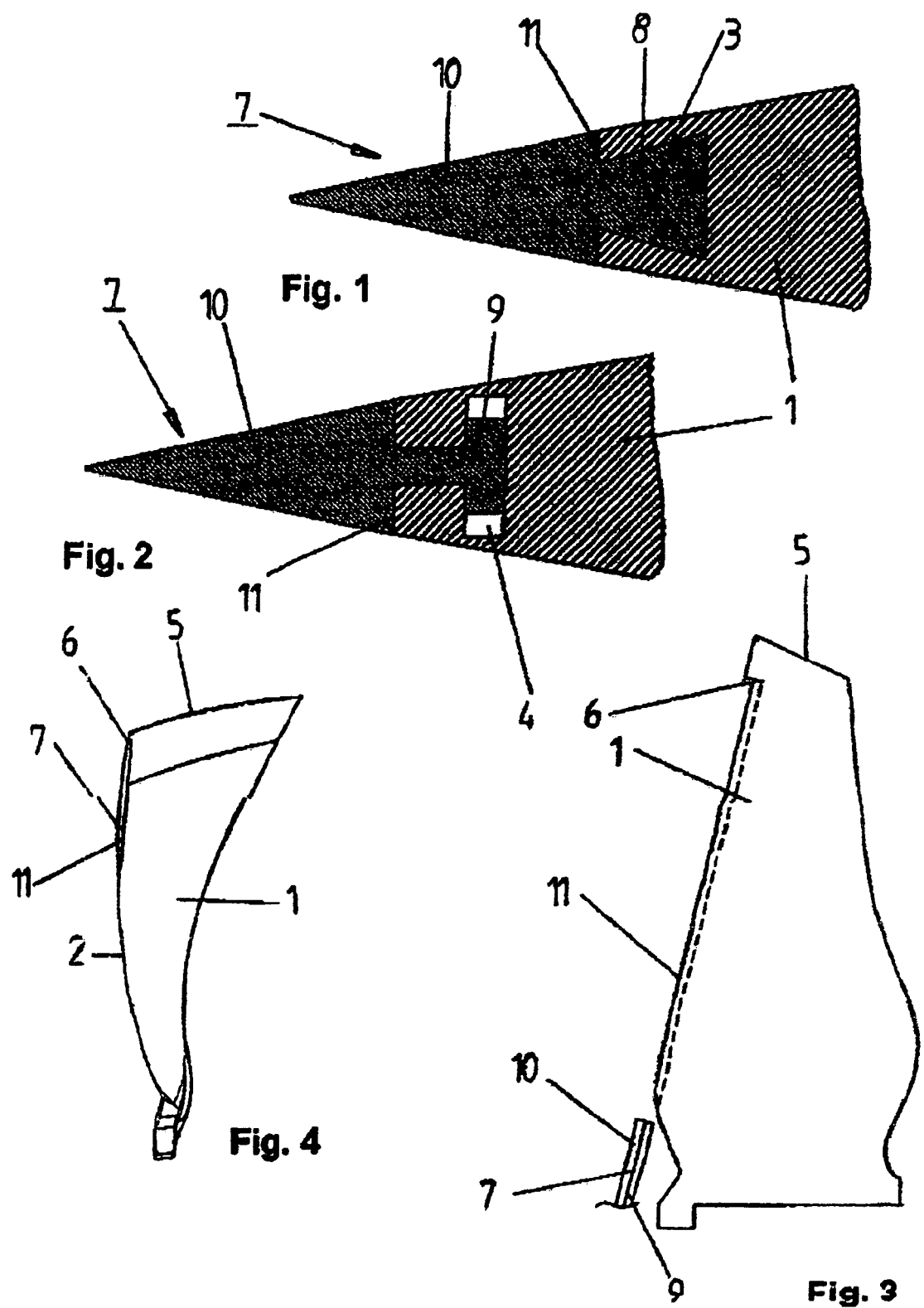

LEADING EDGE CONFIGURATION FOR COMPRESSOR BLADES OF GAS TURBINE ENGINES

This application claims priority to German Patent Application DE 10 2005 061 673.9 filed Dec. 21, 2005, the entirety of which is incorporated by reference herein.

BACKGROUND OF THE INVENTION

This invention relates to a leading edge configuration for compressor blades of gas turbine engines.

Compressor blades are the foremost rotating components of a gas turbine engine and subject to considerable loads by centrifugal forces, gas pressure and vibration of the airfoils stimulated by the flow medium, but in particular also by ingested foreign bodies and bird strikes. The blades have a supersonic profile with the leading edge being as thin as possible and featuring a sharp form. Such a requirement on the shape disagrees, however, with the loading and damage situation which the leading edge may encounter by the impingement of foreign objects.

Erosion and other damage caused by the impingement of foreign bodies occur particularly marked on the leading edge and the pressure side of the compressor blade. Provision of a robust compressor blade leading edge with an enlarged radius to counteract foreign object damage in this area conflicts, however, with the considerable aerodynamic losses and reduction of engine performance arising therefrom.

In order to anticipate further deterioration of a compressor blade damaged in service by foreign bodies, all compressor blades must, from time to time, be regrouped and reprofiled in the area of the leading edge. Such regrinding can, however, never be accomplished in an optimal manner, even apart from the fact that regrinding and reprofiling incur considerable work effort. This means that such grinding increases the profile of the leading edge and, in consequence, the aerodynamic loss. Moreover, the leading edge cannot be regrouped infinitely.

The compressor blades of a gas-turbine engine are additionally and significantly loaded by the impact resulting from the impingement of a bird on the compressor blades. Also in this case, a small leading edge radius, i.e. a pointed, sharp form of the leading edge of the compressor blade is advantageous, as such a sharp leading edge will cut through the bird straight away, thus considerably reducing the impact on and the loading of the blade. However, the design of a leading edge in consideration of this requirement again conflicts with the risk of rapid damage by erosion, the resultant maintenance effort and the aerodynamic loss.

BRIEF SUMMARY OF THE INVENTION

The present invention, in a broad aspect, provides an aerodynamically advantageous compressor blade characterized by long service life and reduced maintenance requirement.

It is a particular object of the present invention to provide solutions to the above problems by a compressor blade designed in accordance with the features described herein. Further advantageous developments and useful embodiments of the present invention be apparent from the description below.

The present invention, in its essence, provides a separate, detachable leading edge rail at the leading edge of the compressor blade, actually in the section of the blade in which supersonic conditions exist, which is replaceable by a new leading edge rail in the case of damage or wear. This will significantly reduce the maintenance effort and increase the life of the compressor blade in general. In service, a compressor blade with optimal design in the area of the leading edge is available which meets the supersonic conditions existing in a limited blade area and the problems resulting from bird strike.

The leading edge rail, which includes a triangular tip and a rail base, is positively and elastically held in a locating groove on the leading edge of the compressor blade and secured against centrifugal force by a stop.

In accordance with a further feature of the present invention, the leading edge rail is constructed from a hard, erosion-resistant material. However, the leading edge rail is dimensioned slenderly enough, to be elastically deformable and insertable into the locating groove extending along the curved leading edge of the compressor blade under elastic deformation and to elastically lock in the locating groove.

Moreover, the leading edge rail is dimensioned under the aspect of low weight, as a result of which the centrifugal forces acting upon the stop are low and even a loss of the leading edge rail would only slightly impair operation.

In a further development of the present invention, the leading edge rail can additionally be fixed in the locating groove by adhesive bonding. The leading edge rail can also include individual segments arranged one after the other in the locating groove.

In a further embodiment of the present invention, an impression is produced in the both-side outer surfaces on the compressor blade leading edge which is in positive engagement and flush with a profiled lateral tongue extending from the side faces of the leading edge rail, with the both-side profiled lateral tongues being additionally attached to the compressor blade by fasteners, such as screws or rivets.

BRIEF DESCRIPTION OF THE DRAWINGS

An embodiment of the present invention is more fully described in light of the accompanying drawings. In the drawings, FIG. 1 is a sectional view of the leading edge area of a compressor blade in a first embodiment, FIG. 2 is a sectional view of the leading edge area of a compressor blade in a second embodiment, FIG. 3 is a side view of a compressor blade prior to insertion of a replaceable leading edge element, and FIG. 4 is a perspective view of a compressor blade with a replaceable leading edge rail fitted to a partial area of the blade leading edge.

DETAILED DESCRIPTION OF THE INVENTION

As shown in FIGS. 1 and 2, the compressor blade 1, which can be of the solid or hollow type and is usually made of titanium, is provided in a certain, flattened portion 11 with a groove which, in the present embodiments, is provided as dovetail-style locating groove 3 or tee-shaped locating groove 4. Other groove shapes can also be used. The flattened portion 11 with the locating groove 3 or 4, respectively, is provided in the area of the compressor blade 1 in which supersonic conditions exist, but terminates shortly remote of the blade tip 5 so that a stop 6 is created at the upper end of the locating groove before the blade tip 5. Into the locating groove 3, 4 a leading edge rail 7 is inserted which has a Tee-shaped or dovetail-style rail base 8, 9 which corresponds to the locating groove profile and is fed into the locating groove 3, 4 up to the stop 6. The positive lock and the stop 6 retain the leading edge rail 7 on the compressor blade 1 and prevent it from getting detached.

The leading edge rail 7 is constructed of a hard, relatively erosion-resistant material, for example stainless cutlery steel or manganese hard steel, and features a profile of such slenderness that it is adequately elastic to be insertable into the locating groove 3, 4 provided on the leading edge of the compressor blade 1 and curved in correspondence with the blade form. Since the leading edge rail 7 is elastically deformed as it is inserted, it will lock and be elastically fixed in the locating groove 3, 4. In addition, the rail base 8 or 9, respectively, of the leading edge rail 7 may be adhesively bonded in the locating groove 3 or 4, respectively. The radius at the forward edge of the tip 10 of the leading edge rail is approx. 0.01 to 0.5 mm. The leading edge rail 7 may also include several segments which are inserted into the locating groove 3, 4 one after the other.

A compressor blade 1 damaged in the area of the leading edge 2 by bird strike or other foreign object impact is repairable with low effort by removing the damaged leading edge rail 7 and inserting a new leading edge rail 7. Upon each repair, a compressor blade 1 with pointed leading edge 2 is obtained which, on the one hand, fulfills the requirements on the aerodynamic design of the blade and, on the other hand, limits the damage to the engine due to bird strike. The high maintenance effort required by regrinding damaged leading edges is significantly reduced. Since the leading edge rail 7 is replaceable repeatedly, service life of the compressor blade 1 is increased. The life of the compressor blade is also positively influenced by the fact that cracks in the replaceable leading edge rail 7 occurring in service cannot propagate into the adjacent part of the compressor blade 1 so that the compressor blades affected can remain in service. Owing to the low weight of the leading edge rail 7, service can be continued without difficulties even if the leading edge rail is lost. The centrifugal forces which the leading edge rail 7 exerts on the stop 6 during service are so low that the compressor blade 1 cannot be destroyed by the leading edge rail 7.

LIST OF REFERENCE NUMERALS

1 Compressor blade
2 Leading edge
3 Dovetail-style locating groove
4 Tee-shaped locating groove
5 Blade tip
6 Stop
7 Leading edge rail
8 Rail base (dovetail-style profile)
9 Rail base (tee-shaped profile)
10 Triangular tip of 7
11 Flattened portion of 2

What is claimed is:

1. A compressor blade for a gas turbine engine, comprising:
a locating groove provided at a leading edge of the compressor blade extending in a supersonic area of the compressor blade and having an end portion which ends remotely from a blade tip to act as a stop,
a replaceable, longitudinally elastically deformable leading edge rail being positively and elastically locked in the locating groove and held against centrifugal force by the stop.

2. A compressor blade in accordance with claim 1, wherein the leading edge rail is made of an erosion-resistant, hard material and is dimensioned slenderly enough, to ensure an elasticity required for insertion into the locating groove curved in correspondence with a blade form.

3. A compressor blade in accordance with claim 2, wherein the leading edge rail is made from at least one of the group of stainless cutlery steel, manganese hard steel and another nickel-base alloy.

4. A compressor blade in accordance with claim 1, wherein the leading edge rail comprises an essentially triangular tip and a rail base for insertion into the locating groove.

5. A compressor blade in accordance with claim 4, wherein a leading edge of the compressor blade has a flattened portion for engaging the leading edge rail and the locating groove is positioned in the flattened portion and has one of a dovetail-style and a tee-shaped profile.

6. A compressor blade in accordance with claim 1, wherein the leading edge rail is adhesively bonded in the locating groove.

7. A compressor blade in accordance with claim 1, wherein the leading edge rail includes at least two segments inserted into the locating groove.

8. A compressor blade in accordance with claim 1, wherein a radius at a forward end of the leading edge rail is between 0.01 to 0.5 mm inclusive.

9. A compressor blade in accordance with claim 1, wherein a leading edge of the compressor blade has a flattened portion for engaging the leading edge rail and the locating groove is positioned in the flattened portion and has one of a dovetail-style and a tee-shaped profile.

10. A replaceable leading edge rail for attachment to a compressor blade for a gas turbine engine, comprising:
an essentially triangular tip and a rail base for insertion into a locating groove positioned at a leading edge of the compressor blade extending in a supersonic area of the compressor blade, the locating groove having one of a dovetail-style and a tee-shaped profile, wherein the rail base is configured in a shape corresponding to the profile of the locating groove and the leading edge rail is longitudinally elastically deformable so as to positively and elastically lock in the locating groove upon insertion of the rail base into the locating groove, the leading edge rail being replaceable when damaged by removing the damaged leading edge rail from the locating groove.

11. A replaceable leading edge rail in accordance with claim 10, wherein the rail base includes a flattened portion for engaging a flattened portion on the compressor blade in which the locating groove is positioned, with the rail base having one of a dovetail-style and a tee-shaped profile to fit the correspondingly shaped locating groove.

12. A replaceable leading edge rail in accordance with claim 11, wherein the leading edge rail is made of an erosion-resistant, hard material and is dimensioned slenderly enough, to ensure an elasticity required for insertion into the locating groove curved in correspondence with a blade form.

13. A replaceable leading edge rail in accordance with claim 12, wherein the leading edge rail is made from at least one of the group of stainless cutlery steel, manganese hard steel and another nickel-base alloy.

14. A replaceable leading edge rail in accordance with claim 13, wherein a radius at a forward end of the leading edge rail is between 0.01 to 0.5 mm inclusive.

15. A replaceable leading edge rail in accordance with claim 10, wherein the leading edge rail is made of an erosion-resistant, hard material and is dimensioned slenderly enough, to ensure an elasticity required for insertion into the locating groove curved in correspondence with a blade form.

16. A replaceable leading edge rail in accordance with claim 10, wherein the leading edge rail is made from at least one of the group of stainless cutlery steel, manganese hard steel and another nickel-base alloy.

17. A replaceable leading edge rail in accordance with claim 10, wherein a radius at a forward end of the leading edge rail is between 0.01 to 0.5 mm inclusive.

18. A replaceable leading edge rail in accordance with claim 10, wherein the locating groove includes an end portion which ends remotely from a blade tip to act as a stop.

19. A replaceable leading edge rail in accordance with claim 18, wherein the leading edge rail is held against centrifugal force by the stop.

* * * * *